United States Patent
Kumagai et al.

(10) Patent No.: US 8,516,245 B2
(45) Date of Patent: *Aug. 20, 2013

(54) METHOD, PRODUCT AND APPARATUS FOR ACCELERATING PUBLIC-KEY CERTIFICATE VALIDATION

(75) Inventors: Yoko Kumagai, Tokyo (JP); Takahiro Fujishiro, Yokohama (JP); Tadashi Kaji, Fujisawa (JP); Shingo Hane, Yokohama (JP); Hitoshi Shimonosono, Funabashi (JP)

(73) Assignee: Hitachi, Ltd., Tokyo (JP)

( * ) Notice: Subject to any disclaimer, the term of this patent is extended or adjusted under 35 U.S.C. 154(b) by 180 days.

This patent is subject to a terminal disclaimer.

(21) Appl. No.: 12/488,051

(22) Filed: Jun. 19, 2009

(65) Prior Publication Data

US 2009/0259842 A1 Oct. 15, 2009

Related U.S. Application Data

(63) Continuation of application No. 10/788,417, filed on Mar. 1, 2004, now Pat. No. 7,558,952.

(30) Foreign Application Priority Data

Oct. 10, 2003 (JP) .................................. 2003-351509

(51) Int. Cl.
*H04L 29/06* (2006.01)
(52) U.S. Cl.
USPC ............................. 713/156; 713/158; 713/175
(58) Field of Classification Search
USPC .......................................... 713/156, 158, 175
See application file for complete search history.

(56) References Cited

U.S. PATENT DOCUMENTS

| 5,745,574 | A | | 4/1998 | Muftic |
| 6,073,242 | A | | 6/2000 | Hardy et al. |
| 6,134,550 | A | * | 10/2000 | Van Oorschot et al. ............... 1/1 |
| 6,209,091 | B1 | | 3/2001 | Sudia et al. |
| 6,397,329 | B1 | | 5/2002 | Aiello et al. |

(Continued)

FOREIGN PATENT DOCUMENTS

JP 11-45259 2/1999

OTHER PUBLICATIONS

Elley, Yassir., et al. "Building Certification Paths: Forward vs. Reverse." Network and Distributed System Security, 1997, Symposium on San Diego, CA, USA, Feb. 10-11, XP002307948, pp. 8.

(Continued)

*Primary Examiner* — Amare F Tabor
(74) *Attorney, Agent, or Firm* — McDermott Will & Emery LLP

(57) ABSTRACT

A validation authority for certificates searches for and verifies paths and certificate revocation lists periodically, and classifies the paths into valid paths and invalid paths in accordance with the results of the validations, so as to register the paths in databases beforehand. Besides, in a case where a request for authenticating the validity of a certificate has been received from an end entity, the validation authority judges the validity of the public key certificate by checking in which of the valid-path database and the invalid-path database a path corresponding to the request is registered. On the other hand, in a case where the path corresponding to the validity authentication request is not registered in either of the databases, the validity of the public key certificate is authenticated by performing path search and validation anew.

8 Claims, 12 Drawing Sheets

(56) References Cited

U.S. PATENT DOCUMENTS

| | | | |
|---|---|---|---|
| 6,760,768 B2 * | 7/2004 | Holden et al. | 709/227 |
| 6,990,583 B2 | 1/2006 | Matsuyama et al. | |
| 7,080,251 B2 | 7/2006 | Fujishiro et al. | |
| 7,149,894 B2 * | 12/2006 | Futamura et al. | 713/157 |
| 7,203,753 B2 | 4/2007 | Yeager et al. | |
| 7,213,262 B1 | 5/2007 | Elley et al. | |
| 7,237,107 B2 | 6/2007 | Wray | |
| 7,290,133 B1 | 10/2007 | Montgomery | |
| 7,367,044 B2 * | 4/2008 | Fowler et al. | 726/1 |
| 2002/0046340 A1 * | 4/2002 | Fujishiro et al. | 713/171 |
| 2003/0097566 A1 | 5/2003 | Kumagai et al. | |
| 2004/0128503 A1 * | 7/2004 | Watanabe et al. | 713/157 |

OTHER PUBLICATIONS

Japanese Office Action issued in corresponding Japanese Patent Application No. JP 2003-351509, dated Sep. 5, 2006.

Fujishiro, et al., "A study of speed-up method of the certificate validation in multiple PKI domains," Computer Security Symposium 2002, Oct. 30, 2002, pp. 373-378.

European Search Report, issued in European Patent Application No. 07010174.6-2415, dated on Aug. 16, 2007.

Hunter, B. "Simplifying PKI Usage through a Client-Server Architecture and Dynamic Propagation of Certificate Paths and Repository Addresses" Proceedings of the 13th International Workshops on Database and Expert Systems Applications, pp. 1-6, 2002.

* cited by examiner

FIG.9

PATH SEARCH RESULT (IN CASE OF FIG. 2)

| VALID PATH | | | |
|---|---|---|---|
| TRUST ANCHOR CA | EE CERTIFICATE ISSUING CA | PATH | CRL |
| $CA_{11}$ | $CA_{12}$ | $CA_{11} - CA_{12}$ | VALID |
| | $CA_{22}$ | $CA_{11}-CAbridge-CA_{21}-CA_{22}$ | VALID |
| $CA_{21}$ | $CA_{12}$ | $CA_{21}-CAbridge-CA_{11}-CA_{12}$ | VALID |
| | $CA_{12}$ | $CA_{21} - CA_{22}$ | VALID |
| CAbridge | $CA_{22}$ | $CAbridge-CA_{11}-CA_{12}$ | VALID |
| | $CA_{12}$ | $CAbridge-CA_{21}-CA_{22}$ | VALID |

| INVALID PATH | | | |
|---|---|---|---|
| TRUST ANCHOR CA | EE CERTIFICATE ISSUING CA | PATH | CRL |
| $CA_{11}$ | $CA_{13}$ | $CA_{11} - CA_{12}$ | INVALID |
| $CA_{21}$ | $CA_{12}$ | $CA_{21}-CAbridge-CA_{11}-CA_{12}$ | INVALID |
| CAbridge | $CA_{12}$ | $CAbridge-CA_{11}-CA_{12}$ | INVALID |

METHOD, PRODUCT AND APPARATUS FOR ACCELERATING PUBLIC-KEY CERTIFICATE VALIDATION

RELATED APPLICATIONS

This application is a continuation of U.S. application Ser. No. 10/788,417, filed Mar. 1, 2004, now U.S. Pat. No. 7,558,952, which claims priority based on a Japanese patent application, No. 2003-351509 filed on Oct. 10, 2003, the entire contents of which are incorporated herein by reference.

BACKGROUND OF THE INVENTION

The present invention relates to techniques in a public key infrastructure (hereinbelow, termed "PKI"), well suited for authenticating the validity of a public key certificate to validate a signature for an electronic procedure received by a certain terminal.

In various organizations and parties on private and public bases, PKIs have been introduced and made ready for use in order to electronicize manifold procedures which were taken with sheets of paper in the past.

FIG. 12 shows an example of the relationship among a plurality of certificate authorities (hereinbelow, termed "CAs") which exist in a PKI.

As shown in the figure, the CAs each issuing and managing public key certificates form a group having a tree structure whose apex is the root certificate authority CA1. The group is called "security domain", and it is a PKI unit which is operated under one policy management organ. The root certificate authority CA1 issues public key certificates to the certificate authorities $CA2_1$-$CA2_n$ which are located directly downstream of itself. Besides, each of the certificate authorities $CA2_1$-$CA2_n$ issues public key certificates to the certificate authorities $CA3_1$-$CA3_{n1}$ which are located directly downstream of itself. In this manner, each certificate authority located directly upstream in the tree issues public key certificates to the CAs located directly downstream of itself. Further, each of the CAs located at the downmost stream in the tree (hereinbelow, called "end-entity certificate issuing CAs") $CAS_1$-$CAS_{nm}$ issues public key certificates to users taking electronic procedures (hereinbelow, called "end entities: EE") $EE_1$-$EE_x$.

The legality of a secret key (signature key) which each of the apparatuses $EE_1$-$EE_x$ uses in generating the signature of an electronic document is certified by the public key certificate issued by that one of the terminal admitting certificate authorities $CAS_1$-$CAS_{nm}$ which admits the pertinent apparatus itself. In turn, the legality of a secret key which each of the terminal admitting certificate authorities $CAS_1$-$CAS_{nm}$ uses in generating the signature of the issued public key certificate is certified by the public key certificate issued by that one of the certificate authorities $CA(S-1)_1$-$CA(S-1)_{n(m-1)}$ which admits the pertinent terminal admitting certificate authority itself. Accordingly, the secret key which each of the apparatuses $EE_1$-$EE_x$ uses in generating the signature is finally certified by the public key certificate issued by the root certificate authority CA1. The certificate authority which finally certifies the legalities of the keys respectively used in generating the signatures by the apparatuses $EE_1$-$EE_x$, in other words, which is trusted by the apparatuses $EE_1$-$EE_x$ and which is located at the upmost stream in the tree, is called "trust anchor CA".

Referring now to FIG. 12, the apparatus $EE_1$ affixes a signature to an electronic document which is to be transmitted to the apparatus $EE_x$, by using the secret key held by the apparatus $EE_1$ itself. Besides, the apparatus $EE_1$ attaches to the signed electronic document a public key certificate of $EE_1$ paired with the above secret key and which has been issued by the terminal admitting certificate authority $CAS_1$, and it transmits the document and the certificate to the apparatus $EE_x$.

The apparatus $EE_x$ can validate the signature of the electronic document received from the apparatus $EE_1$, by employing the public key certificate of the apparatus $EE_1$ attached to this electronic document. Since, however, the public key certificate of the apparatus $EE_1$ is not one issued by the certificate issuing authority $CAS_{nm}$ for the apparatus $EE_x$, this apparatus $EE_x$ cannot immediately trust the pertinent public key certificate unless it authenticates that the validity of the pertinent public key certificate is certified by the root certificate authority CA1 which is the trust anchor of apparatus $EE_x$ itself. A validity authentication process for the public key certificate here is executed by the following steps: (1) Search for Path from Trust anchor CA to certificate authority CA which is Issue origin of Public key certificate; With a trust anchor CA (here, the root certificate authority CA1) set as a start CA, the processing of inspecting the issue destinations of public key certificates issued by the start CA and further inspecting if any downstream CAs are included among the inspected issue destinations, the issue destinations of public key certificates issued by the downstream CAs is continued until a CA issuing an EE certificate (here, the certificate authority $CAS_1$ issuing the public key certificate of the end entity $EE_1$) is included among the further inspected issue destinations of the public key certificates. Thus, a path from the trust anchor CA to the EE certificate issuing CA is searched for. (2) Validation of Path searched for; There are obtained public key certificates issued from the individual CAs located on the path searched for by the step (1), to the CAs located directly downstream of the respective CAs on the path. Besides, the processing of validating the signature of the pertinent public key certificate whose validity is to be authenticated (here, the public key certificate issued to the end entity $EE_1$ by the EE-certificate issuing certificate authority $CAS_1$), in the light of the public key certificate issued by the CA located directly upstream of the CA having issued the pertinent public key certificate (here, the EE-certificate issuing certificate authority $CAS_1$), and subsequently validating, if it has been verified, the signature of the public key certificate issued by the CA located directly upstream, in the light of the public key certificate issued by the CA located directly upstream still further, is continued until the upstream CA reaches the trust anchor. In a case where the signature has been verified up to the trust anchor in due course, the validity of the public key certificate whose the validity is to be authenticated shall have been authenticated.

The apparatus $EE_x$ can authenticate the legality of the electronic document received from the apparatus $EE_1$, in such a way that the signature of the electronic document is verified using the public key certificate of the apparatus $EE_1$ attached to the electronic document, and that the validity of the public key certificate of the apparatus $EE_1$ used for validating the signature of the electronic document is authenticated in accordance with the steps (1) and (2) stated above.

Incidentally, it is premised in the foregoing that the process for authenticating the validity of the public key certificate is executed in the EE apparatus. However, the public-key certificate validity authentication process is heavy in load, and a high processing capability is required of the EE apparatus for the execution of the process. It has therefore been proposed by the IETF (Internet Engineering Task Force) which is a party for stipulating the standardizations of various technologies on the Internet, that an authority for authenticating the validity of a certificate (hereinbelow, termed "validation authority: VA") as is connected to the EE apparatuses through a network is disposed so as to authenticate the validity of the public key certificate instead of the EE apparatus. In the case where the validity of the public key certificate is authenticated in the VA apparatus, the EE apparatus first sends the VA apparatus a request for authenticating the validity of the public key certificate. Subsequently, the VA apparatus executes the process of the above steps (1) and (2). Finally, it sends the EE apparatus the result of the process.

On this occasion, a method for shortening a time period which is expended since the request of the EE apparatus for the public-key certificate validity authentication till the obtainment of the result is as stated below.

In the VA apparatus, paths are periodically searched for and are registered in a path database beforehand. In a case where a certain EE apparatus has made the request for the public-key certificate validity authentication, the path database of the VA apparatus is searched for a corresponding path, and the path searched for is verified, whereby the validity of the public key certificate is authenticated (refer to, for example, U.S. Pat. No. 6,134,550 hereinafter, Patent Document 1).

In another method, in the VA apparatus, all paths are periodically searched for and are verified beforehand. Only the paths which have been succeeded in the validations (valid paths) are registered in a path database. In a case where a certain EE apparatus has made a request for the public-key certificate validity authentication, it is checked whether or not a corresponding path is registered in the path database of the VA apparatus, whereby the validity of the public key certificate is authenticated (refer to, for example, US Patent Published Application No. 20020046340 hereinafter, Patent Document 2).

SUMMARY OF THE INVENTION

With the method stated in the above patent document 2, in a case where the path corresponding to the request for the public-key certificate validity authentication as received from the EE apparatus is not registered in the path database, the certificate whose validity is to be authenticated is judged to be invalid. In accordance with this method, however, in a case where any path not having existed during the path search exists anew at the reception of the request for the public-key certificate validity authentication from the EE apparatus, a valid public-key certificate is sometimes judged to be invalid. The above patent document 2 describes nothing about a process in such a case.

The above patent document 1 describes nothing, either, about a process in the case where the path corresponding to the request for the public-key certificate validity authentication as received from the EE apparatus is not registered in the path database.

In such a case where the path corresponding to the validity authentication request received by the VA is not registered in the path database, an appropriate result can be produced by performing path search and validation anew. However, there is the problem that the time period of a validity authentication process in this case becomes long.

Currently, PKIs have been introduced and made ready for use in various organizations and parties on private and public bases. It is consequently conjectured that a large number of security domains will be juxtaposed into a complicated PKI configuration. Further, it is conjectured that many validity authentication requests will made when applications utilizing PKIs have come into wide use. In such a case, the time period which is expended since the request of the EE for the authentication of the validity of the public key certificate till the obtainment of the result of the authentication becomes long to incur degradation in service.

The present invention provides a technique which produces an appropriate result even in a case where any path not having existed during path search is formed after the path search, and/or a technique which further shortens a time period that is expended since the request of an EE for the authentication of the validity of a public key certificate till the obtainment of the result of the authentication.

Concretely, in the present invention, a VA apparatus which is connected to a plurality of terminals (EE apparatuses) and CA apparatuses through a network executes processing stated below, in compliance with a request made by a certain EE apparatus, in order to authenticate the validity of a public key certificate.

Regarding all CAs associated by issuing public key certificates, all existent paths are searched for, and the paths detected by the path searches are verified. And, there are acquired certificate revocation lists (hereinbelow, termed "CRLs") concerning EE certificates as are issued by EE certificate issuing CAs located at the end points of the detected paths. It is checked that the acquired CRLs are within validity terms, and the signatures of the CRLs are verified using the public key certificates of the CAs which have issued the CRLs. Further, the paths are classified into the paths having been successfully verified and the paths having failed to be verified, which are registered in a path database. A process for creating the path database is iterated, for example, periodically in accordance with predetermined rules, independently of a validity authentication request for the public key certificate from an EE.

Besides, in a case where the validity authentication request for the public key certificate has been received from a certain EE, it is checked whether or not a path corresponding to the pertinent public key certificate is registered in the path database. In a case where the path is registered in the database as the path having succeeded in the validation, it is checked whether or not the pertinent public key certificate has been revoked using the CRL registered in the database. Thus, the validity of the pertinent public key certificate is authenticated.

On the other hand, in a case where the path corresponding to the pertinent public key certificate is registered in the path database as the path having failed in the validation, it is checked if any valid path exists otherwise than the registered invalid paths. In a case where such a valid path does not exist, the pertinent public key certificate shall have failed in validation. On the other hand, in a case where the new path or a new CRL has been detected, the validity of the pertinent public key certificate is authenticated using the new path or CRL, and the path is additionally registered in the path database on the basis of the result of the validation.

In a case where the path or CRL corresponding to the public key certificate for which the validity authentication request has been made is not registered in the path database, the processing of searching for and validating a path or a CRL is performed anew, thereby to authenticate the validity of the pertinent public key certificate. On this occasion, in a case where the new path or CRL has been detected, the path is additionally registered in the path database on the basis of the result of the validation of the path or the CRL.

According to the present invention, when a request for authenticating the validity of a public key certificate has been received from a certain EE, an appropriate result can be produced even in a case where a new path has been formed after a path search mode. Moreover, in a case where the path corresponding to the validity authentication request is registered as a path having been successfully verified, it is dispensed with to search for any path extending from the trust anchor CA of the EE to the EE certificate issuing CA of the pertinent public key certificate, to validate the detected path, and to validate the signature of a CRL corresponding to the pertinent public key certificate, as indicated in the above steps (1) and (2). In a case where the path corresponding to the validity authentication request is registered as the path having failed invalidation, path search and validation can be performed by a smaller quantity of processing. It is accordingly possible to shorten a time period which is expended since the certain EE has made the request for authenticating the validity of the public key certificate, until the validity is authenticated.

According to the present invention, an appropriate result can be produced even in a case where a new path has been formed after a path search mode, and/or, it is possible to shorten a time period which is expended since the request of an EE for the authentication of the validity of a public key certificate, till the obtainment of the result of the authentication.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 9 is a diagram showing all paths which are detected by the path search unit 51 of the VA in the case where the individual CAs are in the relationship shown in FIG. 2.

DETAILED DESCRIPTION OF THE EMBODIMENTS

Figure 1:
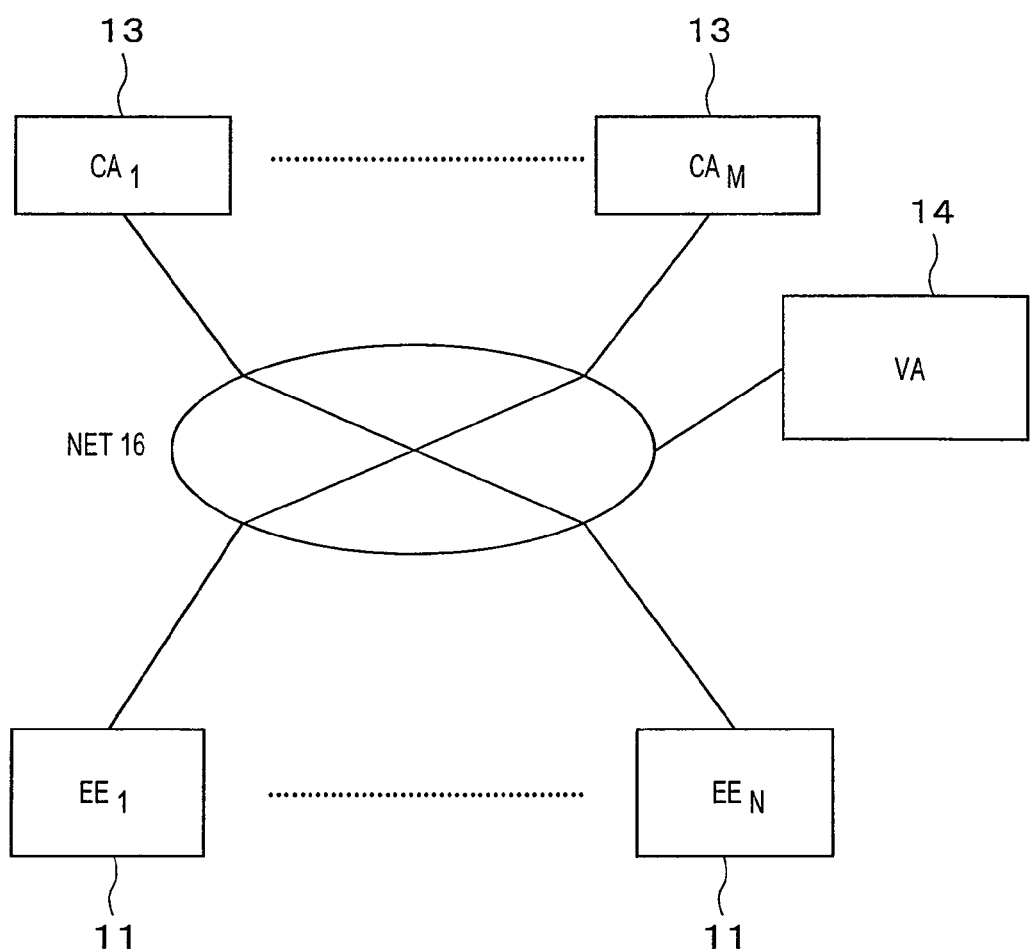
FIG. 1 is a diagram showing the schematic configuration of a PKI system to which an embodiment of the present invention is applied.

FIG. 1 is a diagram showing the schematic configuration of a PKI system to which an embodiment of the present invention is applied.

The PKI system of this embodiment is configured of a plurality of apparatuses (11) $EE_1$-$EE_N$ (generically termed "EE apparatuses (11)") which take procedures electronically, CA (certificate authority) apparatuses (13) $CA_1$-$CA_M$ which conduct the operations of issuing public key certificates, a validation authority VA (14) which authenticates the validity of a public key certificate, and a network (hereinbelow, termed "NET") 16, such as the Internet, which connects the above constituents to one another.

Figure 2:
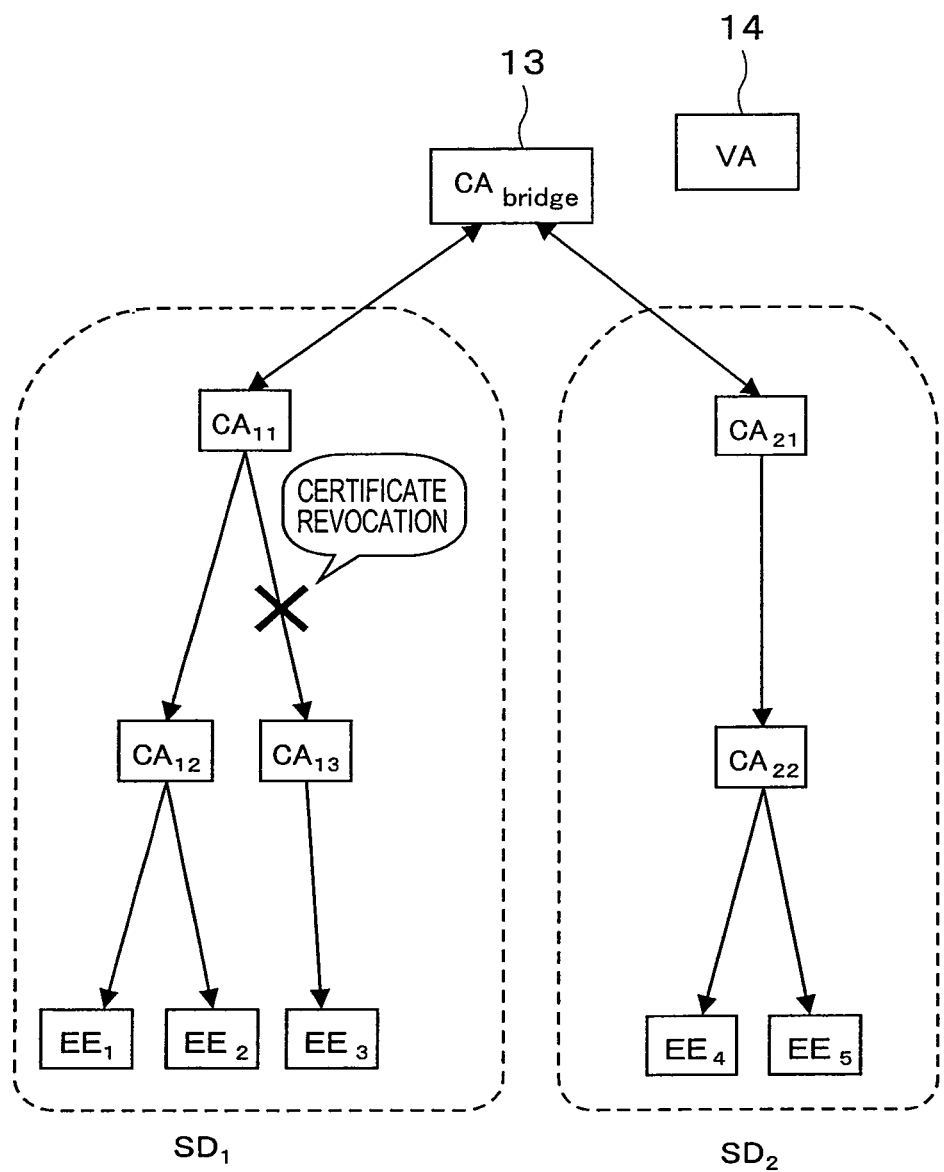
FIG. 2 is a diagram showing an example of the relationship among individual CAs in the PKI system shown in FIG. 1.

FIG. 2 is a diagram showing an example of the relationship among the individual CAs in the PKI system shown in FIG. 1.

As shown in the figure, it is premised in the PKI system of this embodiment that a plurality of security domains SDs (SD1-SD2) on private and governmental bases are coexistent. Besides, the root CAs of the respective security domains SDs ($CA_{11}$ and $CA_{21}$ in FIG. 2) are assumed to perform cross-certification between them and a bridge certificate authority $CA_{bridge}$ by, for example, issuing public key certificates to the bridge certificate authority $CA_{bridge}$ and also having public key certificates issued thereto by the bridge certificate authority $CA_{bridge}$. In this way, a path can be formed between the CA belonging to a certain one of the security domains SDs and the CA belonging to another in order that the validity of the public key certificate issued by one CA may be authenticated by the other CA.

Next, there will be explained the individual apparatuses which constitute the PKI system in FIG. 1.

First, the EE apparatus (11) will be explained with reference to FIG. 3.

The EE apparatus (11) includes a processing unit 30a, a storage unit 30b, a communication unit 30c which serves to communicate with another apparatus through the NET 16, and an input/output unit 30d which inputs/outputs electronic documents created by users (EEs) or electronic documents received from other EEs, and which accepts instructions from the users.

The processing unit 30a includes a signature generation unit 31 which generates a signature for an electronic document, a signature validation unit 32 which verifies the signature, and a control unit 33 which collectively controls the various units of the EE apparatus.

The storage unit 30b includes an electronic document holding unit 34 which holds therein the electronic documents created by the users, a key holding unit 35 which holds therein secret keys (signature keys) and public key certificates of public keys pairing with the respective secret keys, and the self-signature certificate of the CA trusted by the EE that operates the pertinent EE apparatus, and a validation subject holding unit 36 which holds therein signed electronic documents and public key certificates received from other EEs.

In such a configuration, when the control unit 33 has accepted from the user through the input/output unit 30d an instruction to the effect that an electronic document held in the electronic document holding unit 34 is to be transmitted to another end entity EE, it reads out the pertinent electronic document from the electronic document holding unit 34 and delivers this document to the signature generation unit 31. Then, the signature generation unit 31 generates a signature for the delivered electronic document by using a secret key held in the key holding unit 35.

Thereafter, the control unit 33 creates a signed electronic document by affixing the signature generated by the signature generation unit 31, to the electronic document readout of the electronic document holding unit 34. Further, it transmits the created signed electronic document and a public key certificate held in the key holding unit 35, to the EE apparatus being a transmission destination indicated by the user, through the communication unit 30c. When the control unit 33 has received a signed electronic document and a public key certificate from another EE apparatus through the communication unit 30c, it causes the validation subject holding unit 36 to hold the document and the certificate in association and notifies a validation request for them to the signature validation unit 32.

Upon receiving the notification, the signature validation unit 32 verifies the signature of the signed electronic document held in the validation subject holding unit 36, by using the corresponding public key certificate. The signature validation unit 32 transmits to the VA apparatus (14), an authentication request for the validity of the public key certificate used for the above signature validation. On this occasion, if necessary, a validation request for a policy (the reliability of, for example, the amount of business) which concerns the electronic procedure to be taken by the signed electronic document is contained in the authentication request. Thus, only in a case where the validity of the pertinent public key certificate containing the validation of the policy has been authenticated by the VA apparatus (14), the signed electronic document is dealt with as being legal, and it is outputted from the input/output unit 30d as may be needed.

Next, the CA apparatus (13) will be explained with reference to FIG. 4.

The CA apparatus (13) includes a processing unit 40a, a storage unit 40b, a communication unit 40c which serves to communicate with another apparatus through the NET 16, and an input/output unit 40d which inputs/outputs public key certificates etc. and which accepts instructions from the operator of the pertinent CA apparatus and outputs a processed result.

The processing unit 40a includes an issue unit 41 which issues public key certificates, a management unit 42 which manages the public key certificates issued by the issue unit 41, and a control unit 43 which collectively controls the various units of the CA apparatus.

The storage unit 40b includes a public key certificate database 44 which holds therein the public key certificates issued by the issue unit 41, an issue destination management list holding unit 45 which holds therein an issue destination management list that describes the issue destinations of the respective public key certificates held in the public key certificate database 44, and a certificate revocation list holding unit 46.

In such a configuration, when the control unit 43 has accepted a request for the issue of a public key certificate through the input/output unit 40d or the communication unit 40c, it notifies the acceptance of the request to the issue unit 41. Upon receiving the notification, the issue unit 41 creates the corresponding public key certificate. On this occasion, the issue unit 41 signs the public key certificate by using the secret key of its own CA. If necessary, the issue unit 41 describes in the public key certificate the validity term of this public key certificate, the names of other certificate authorities which are not trusted (Name Constraints), the maximum path length which is allowed for the authentication of the validity of the pertinent public key certificate (the maximum allowable number of certificate authorities on a path), and the policy which expresses the amount of business, or the like of the electronic procedure. Thereafter, the created public key certificate is delivered to the issue requester by mail or communication through the input/output unit 40d or the communication unit 40c. Also, the pertinent public key certificate is registered in the public key certificate database 44, and the information of the issue destination (that is, the issue requester) is described in the issue destination management list held in the issue destination management list holding unit 45.

Besides, when the control unit 43 has accepted a request for the revocation of a public key certificate through the input/output unit 40d or the communication unit 40c, it notifies the acceptance of the request to the management unit 42. Upon receiving the notification, the management unit 42 deletes the public key certificate to-be-revoked from the public key certificate database 44 and simultaneously deletes the information of the issue destination of the pertinent public key certificate from the issue destination management list held in the issue destination management list holding unit 45. Further, the management unit 42 periodically creates a certificate revocation list in which information items about public key certificates deleted from the public key certificate database 44 by revocation requests are described, and it causes the certificate revocation list holding unit 46) to hold this list. Incidentally, the management unit 42 shall describe the next date and hour scheduled to create the certificate revocation list, in the created certificate revocation list.

In addition, when the control unit 43 has received a query about the information of the revocation of a public key certificate from another apparatus through the communication unit 40c, it searches the certificate revocation list held in the certificate revocation list holding unit 46, to check whether or not the queried public key certificate has been revoked. The control unit 43 can notify the result of the check as a reply to the other apparatus having queried, through the communication unit 40c (a communication protocol which is used for such a query and a reply is the OCSP (Online Certification Status Protocol)).

The management unit 42 also executes a process for examining the validity terms of individual public key certificates stored in the public key certificate database 44, so as to delete the information of the issue destination of any public key certificate whose validity term has expired, from the issue destination management list held in the issue destination management list holding unit 45.

Next, the VA apparatus (14) will be explained with reference to FIG. 5.

As shown in the figure, the VA apparatus (14) includes a processing unit 50a, a storage unit 50b, a communication unit 50c which serves to communicate with another apparatus through the network NET 16, and an input/output unit 50d which inputs/outputs public key certificates etc. and which accepts instructions from users.

The processing unit 50a includes a path search unit 51, a path validation unit 52, a validity term/revocation state examination unit 53, a validity authentication unit 54, and a control unit 55 which collectively controls the various units of the VA apparatus. The storage unit 50b includes a path database 56, and a certificate revocation list creation schedule time database 57. The path database 56 includes a valid-path database 56A, and an invalid-path database 56B.

The path search unit 51 searches for paths, for example, periodically, the paths extending from any desired CA set as a trust anchor CA, to all EE certificate issuing CAs which issue EE certificates. The path search unit 51 also acquires a certificate revocation list (CRL) concerning the EE certificates which the EE certificate issuing CAs of the detected paths issue. Such searches can be performed by setting the trust anchor CA at each of all CAs or some preset CAs.

Each time a path has been searched for by the path search unit 51, the path validation unit 52 verifies the path detected by the path search unit 51. In a case where the CRL corresponding to the path has been acquired by the path search unit 51, the path validation unit 52 verifies the pertinent CRL. In addition, the path validation unit 52 registers the names of individual CAs constituting the path, individual certificates, and the CRL concerning the EE certificate, in the valid-path database 56A or the invalid-path database 56B according to the result of the validation, in association with the pair of those names of the trust anchor CA and the EE certificate issuing CA which are to be located at both the ends of the pertinent path.

The validity term/revocation state examination unit 53 examines the validity terms and revocation states of the public key certificates constituting the paths as to each of the paths registered in the valid-path database 56A. And it updates the path database 56 in accordance with the result of the examination. In addition, the validity term/revocation state examination unit 53 registers the next certificate revocation list creation schedule times described in the certificate revocation lists obtained from the certificate revocation list holding units 46 of the respective CAs, in a certificate revocation list creation schedule time database 57 in association with the pertinent CAs.

In compliance with a request made by the EE apparatus, the validity authentication unit 54 authenticates the validity of a public key certificate with the trust anchor CA as the start point of trust.

Figure 3:
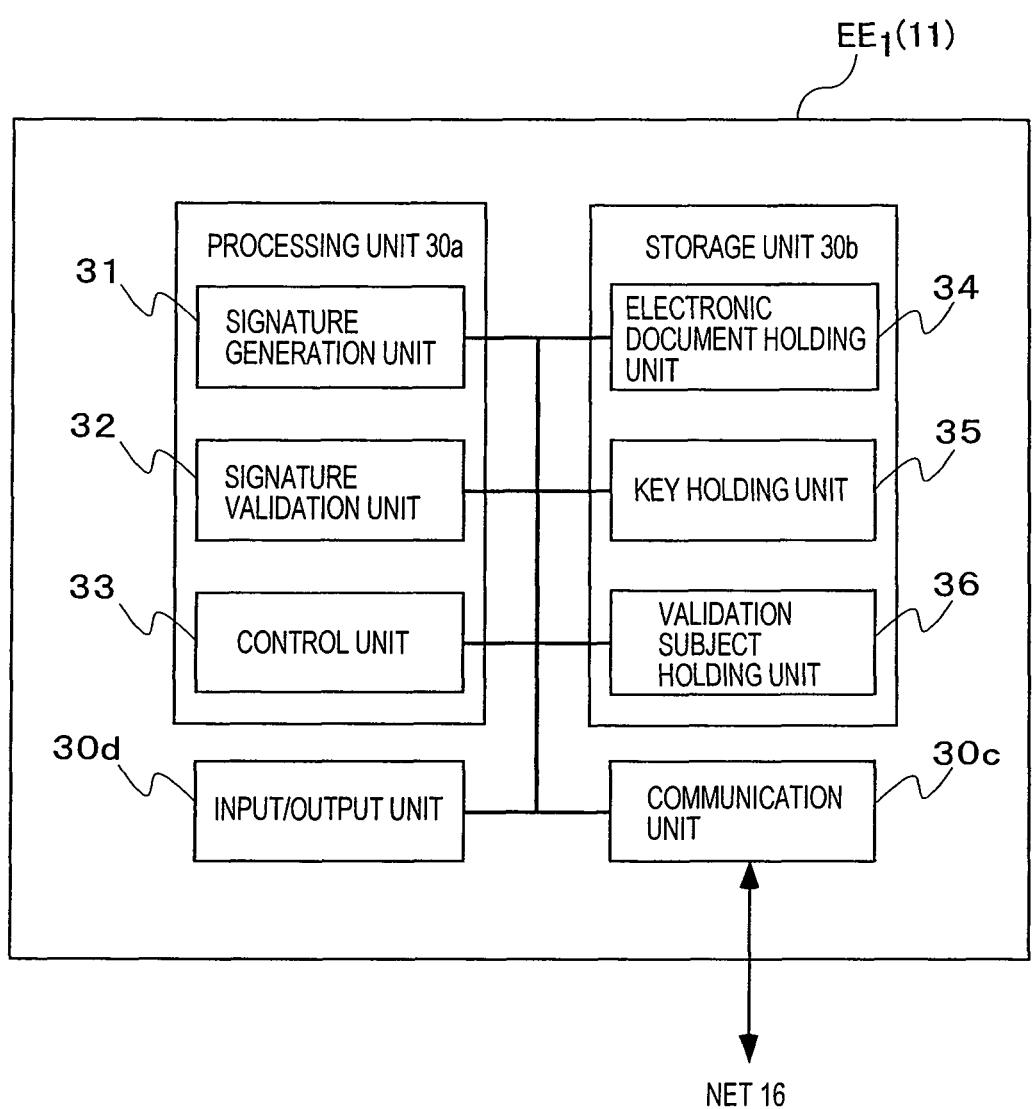
FIG. 3 is a diagram showing the schematic configuration of an EE shown in FIG. 1.
Figure 4:
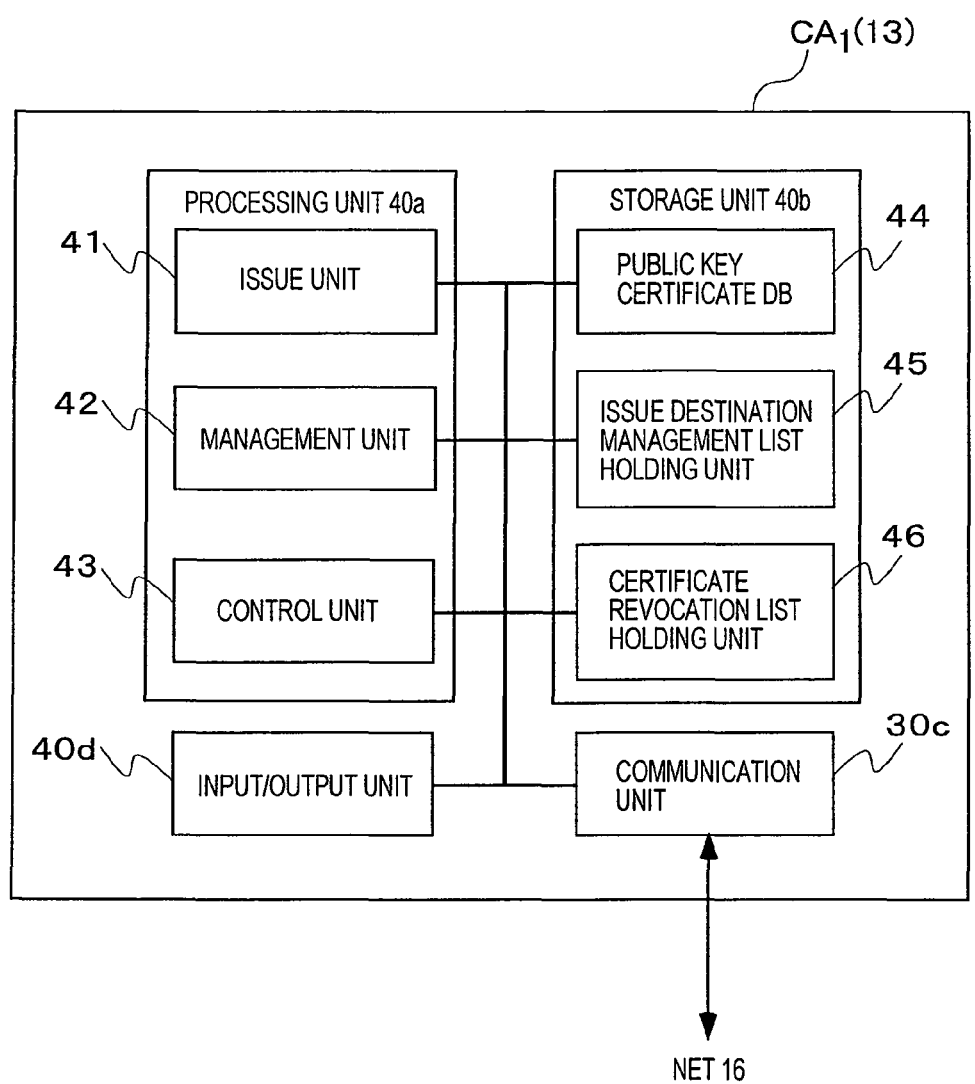
FIG. 4 is a diagram showing the schematic configuration of a CA shown in FIG. 1.
Figure 5:
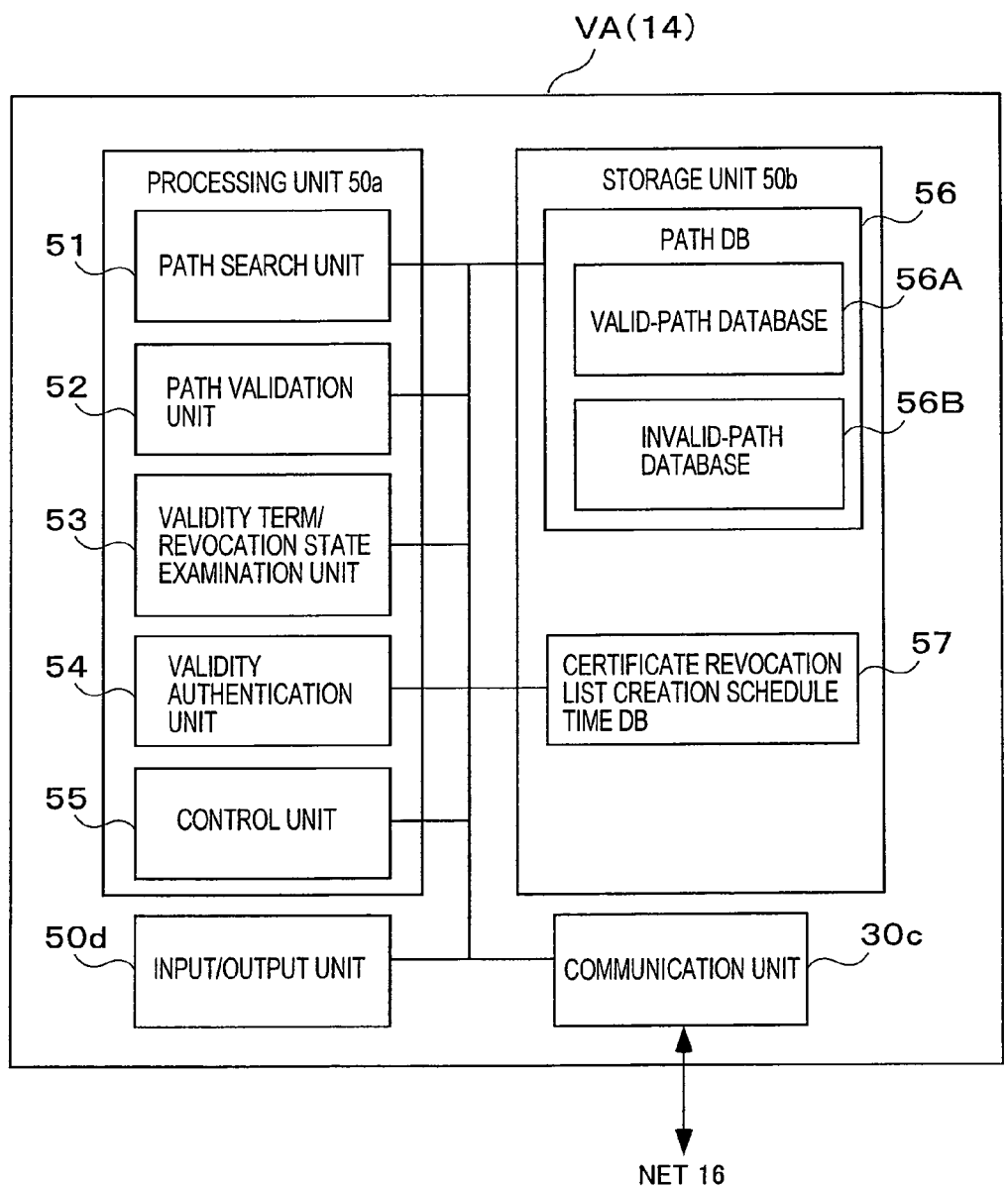
FIG. 5 is a diagram showing the schematic configuration of a VA shown in FIG. 1.
Figure 6:
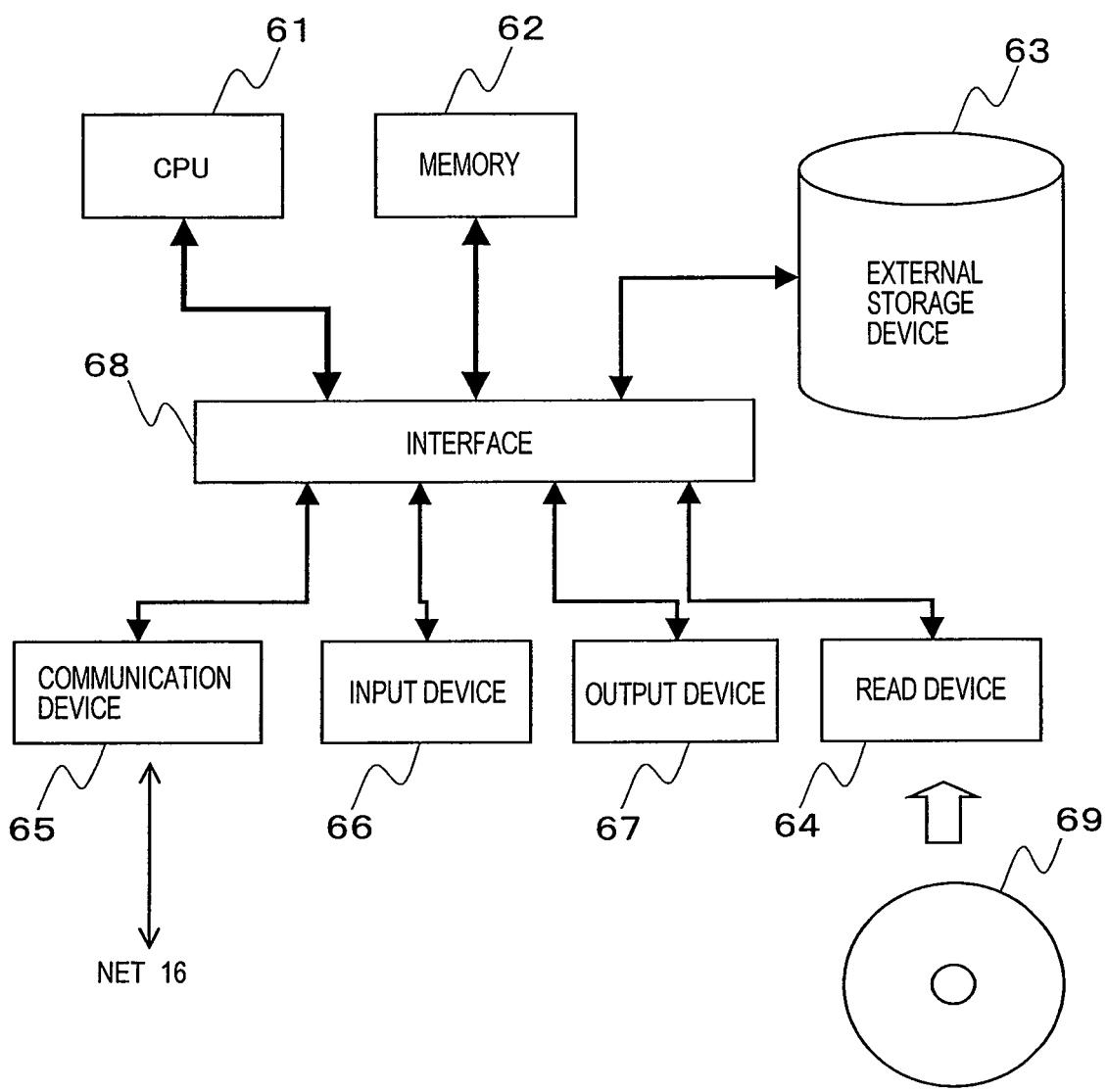
FIG. 6 is a diagram showing the respective hardware configuration examples of the EE, CA and VA shown in FIGS. 3-5.

Incidentally, the EE apparatus (11), CA apparatus (13) and VA apparatus (14) shown in FIGS. 3-5 can be respectively built on a general electronic computer as shown in FIG. 6 by way of example. The electronic computer includes a CPU 61, a memory 62, an external storage device 63 such as hard disk, a read device 64 which reads information from a portable storage medium 69 such as CD-ROM, a communication device 65 which serves to communicate with another apparatus through the NET 16, an input device 66 such as keyboard or mouse, an output device 67 such as monitor or printer, and an interface 68 which exchanges data among the constituent devices.

The above processing units can be realized in such a way that the CPU 61 runs predetermined programs loaded from the external storage device 63 into the memory 62. More specifically, the communication units 30c, 40c and 50c are realized in such a way that the CPU 61 utilizes the communication device 65; the input/output units 30d, 40d and 50d are done in such a way that the CPU 61 utilizes the input device 66, output device 67 and read device 64; and the storage units 30b, 40b and 50b are done in such a way that the CPU 61 utilizes the memory 62 and external storage device 63. The processing units 30a, 40a and 50a are realized as the processes of the CPU 61.

The predetermined programs may be stored in the external storage device 63 beforehand, or may well be stored in the storage medium 69 which the electronic computer can utilize, so as to be read out of this medium through the read device 64 on occasion. Alternatively, the programs may well be downloaded on occasion from a network being a communication medium which the electronic computer can utilize, or from another apparatus connected with the communication device 66 which utilizes a carrier propagating on a network, so as to be introduced into the external storage device 63.

Next, the operation of the VA apparatus (14) of the above configuration will be explained.

The operation of the VA apparatus (14) in this embodiment is divided into the operation of searching for, validating and managing a path, and the operation of authenticating the validities of public key certificates.

Figure 7:
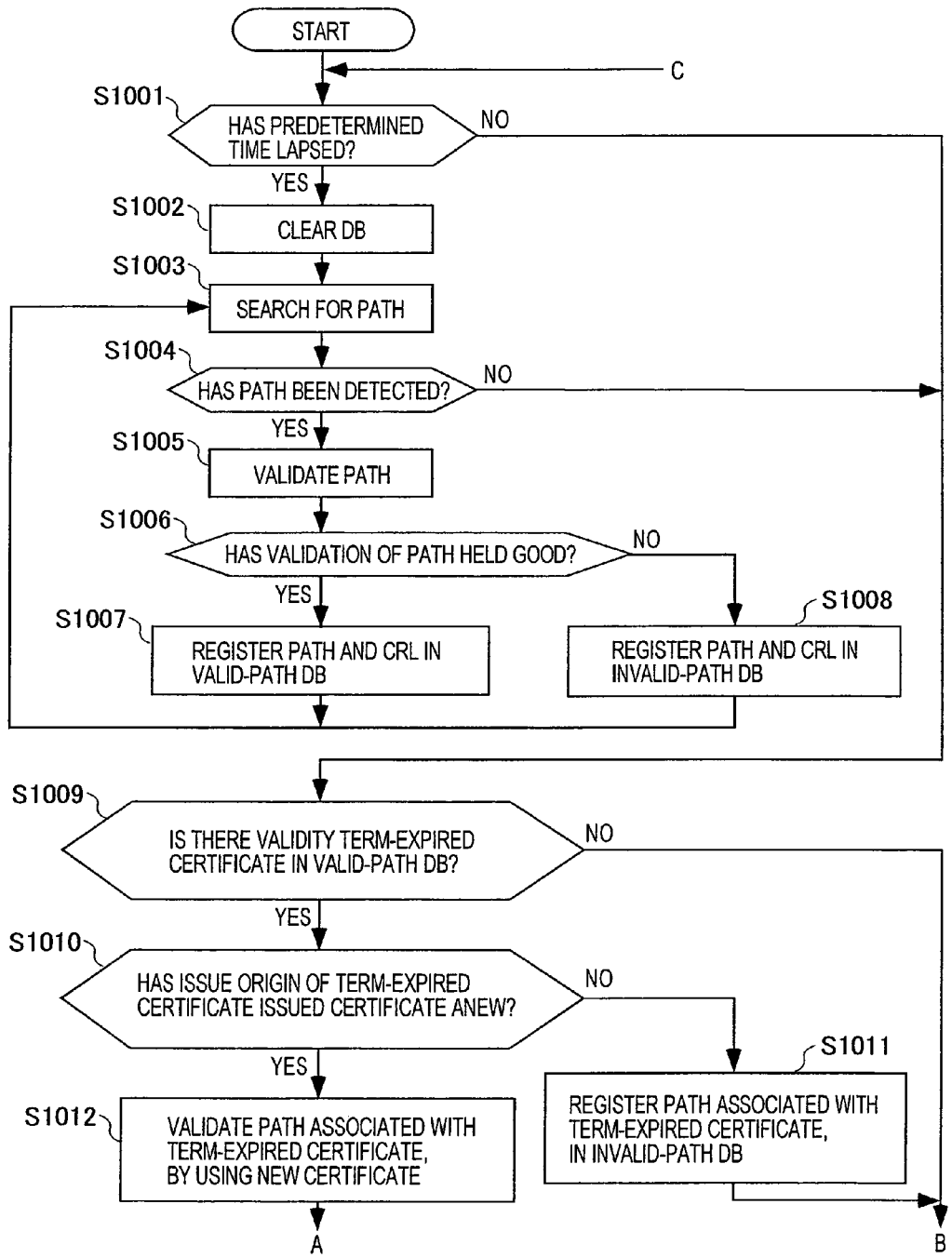
FIG. 7 is a flow chart for explaining the operation of searching for, validating and managing a path as proceeds in the VA shown in FIG. 5.

The operation of searching for, validating and managing paths as proceeds in the VA apparatus (14), will be explained with reference to the flow charts of FIGS. 7 and 8.

When a predetermined time period (for example, one day) set by the manager of the VA has lapsed (step S1001), the control unit 55 once clears the registered contents of the path database 56 (step S1002), and it requests the path search unit 51 to search for paths. Upon receiving the request, the path search unit 51 searches for paths which extend from any desired CA set as a trust anchor CA, to EE certificate issuing CAs (step S1003).

Concretely, the path search unit 51 accesses the trust anchor CA so as to obtain the information items of the issue destinations of public key certificates which have been issued by the trust anchor CA and which are held in the issue destination management list holding unit 45. Subsequently, in a case where the issue destinations obtained are CAs, the path search unit 51 accesses each of the issue destinations so as to further inspect those issue destinations of public key certificates issued by each CA which are held in the issue destination management list holding unit 45. Such a process is continued until the issue destination of public key certificates become EEs, thereby to search for the paths which extend from the trust anchor CA to the EE certificate issuing CAs. Here, in order to prevent the process from being iterated limitlessly due to the loops of the paths, in a case where the issue destinations obtained from a certain CA include any CA which exists in a partial path formed before, the above process in which the certain CA is the issue destination shall not be executed. Besides, the path search unit 51 acquires a CRL issued by a CA which has issued the certificate to the EE located at the end point of the path.

The path search process at the step S1003 will be elucidated more concretely by taking as an example the case where the individual CAs are in the relationship shown in FIG. 2.

First, the path search unit 51 searches for the path with the trust anchor CA being the bridge certificate authority $CA_{bridge}$. This path search unit 51 accesses the bridge certificate authority $CA_{bridge}$ so as to obtain the information items of the certificate authorities $CA_{11}$, $CA_{21}$ as the information items of those issue destinations of public key certificates issued by the bridge certificate authority $CA_{bridge}$ which are held in the issue destination management list holding unit 45.

Subsequently, the path search unit 51 executes the ensuing process by noticing any of the issue destinations ($CA_{11}$, $CA_{21}$) obtained from the bridge certificate authority $CA_{bridge}$. More specifically, if the noticed issue destination is the certificate authority CA (hereinbelow, called "noticed CA"), the path search unit 51 sets the partial path of $CA_{bridge}$-noticed CA. Then, the path search unit 51 accesses the issue destination management list holding unit 45 of the noticed CA so as to further obtain the information items of the issue destinations of public key certificates issued by this noticed CA. It is assumed here that the noticed issue destination is the certificate authority $CA_{11}$, so the partial path of $CA_{bridge}$-$CA_{11}$ is set, and that the information items of the certificate authorities $CA_{bridge}$, $CA_{12}$ and $CA_{13}$ are obtained from the certificate authority $CA_{11}$ as the information items of the issue destinations.

Subsequently, the path search unit 51 checks whether or not any certificate authority CA on the partial path (hereinbelow, called "loop certificate authority CA") is included among the issue destinations ($CA_{bridge}$, $CA_{12}$ and $CA_{13}$) obtained from the certificate authority $CA_{11}$. In a case where any certificate authority is included, the issue destination is excluded from subjects to-be-noticed. Accordingly, the certificate authority $CA_{bridge}$ is excluded from the subjects to-behandled here. Subsequently, the path search unit 51 checks whether or not any end entity EE is included among the issue destinations obtained from the certificate authority $CA_{11}$. In a case where the EE is included among the issue destinations of certificates issued by a certain CA, this CA becomes an EE certificate issuing CA. Since, however, any EE is not included among the issue destinations obtained from the certificate authority $CA_{11}$, this certificate authority $CA_{11}$ is not the EE certificate issuing CA. Accordingly, the path search unit 51 notices either of the issue destinations except the loop CA (that is, the certificate authorities $CA_{12}$ and $CA_{13}$) as obtained from the certificate authority $CA_{11}$, in order to stretch up the partial path of $CA_{bridge}$—the certificate authority $CA_{11}$ to the EE certificate issuing CA.

If the noticed issue destination is any certificate authority CA, the path search unit 51 sets a partial path which connects this noticed CA to the partial path set before. Then, the path search unit 51 accesses the issue destination management list holding unit 45 of the noticed CA so as to further obtain the information items of the issue destinations of public key certificates issued by the pertinent noticed CA. It is assumed here that the noticed issue destination is the certificate authority $CA_{12}$, so the path of $CA_{bridge}$-$CA_{11}$-$CA_{12}$ is set, and that the end entities $EE_1$ and $EE_2$ are obtained as the information items of the issue destinations from the certificate authority $CA_{12}$.

Subsequently, the path search unit 51 checks whether or not any loop certificate authority CA is included among the issue destinations ($EE_1$, $EE_2$) obtained from the certificate authority $CA_{12}$. In a case where any loop CA is included, the issue destination is excluded from subjects to-be-noticed. Since any loop CA is not included here, the path search unit 51 shifts to the next process and checks whether or not any end entity EE is included among the issue destinations obtained from the certificate authority $CA_{12}$. Here, all the obtained issue destinations are the end entities EEs, so that the certificate authority $CA_{12}$ is the EE certificate issuing CA. Therefore, the path search unit 51 detects the path whose end point is the certificate authority $CA_{12}$, as the path which extends from the trust anchor certificate authority $CA_{bridge}$ to the EE-certificate issuing certificate authority $CA_{12}$ ($CA_{bridge}$-$CA_{11}$-$CA_{12}$).

Further, in the case where the path extending to the EE certificate issuing CA has been detected, the path search unit 51 accesses the certificate revocation list holding unit 46 so as to acquire a CRL issued by the pertinent EE-certificate issuing certificate authority $CA_{12}$.

Subsequently, the path search unit 51 checks whether or not any issue destination (certificate authority CA other than the loop CA) which is not noticed yet is existent among the information items of the issue destinations obtained from the certificate authority $CA_{12}$ which is located at the end point on the detected path. In the existence of such an issue destination, the unit 51 continues the above process with this issue destination as the noticed CA. On the other hand, in the nonexistence of such an issue destination, the unit 51 checks whether or not any issue destination (certificate authority CA other than the loop CA) which is not noticed yet is existent among the information items of the issue destinations obtained from the certificate authority $CA_{11}$ which is located directly upstream. Further, in the existence of such an issue destination, the unit 51 continues the above process with this issue destination as the noticed CA. Here, the certificate authority $CA_{13}$ is not noticed yet among the information items of the issue destinations obtained from the certificate authority $CA_{11}$, so that the unit 51 executes the above process with the certificate authority $CA_{13}$ as the noticed CA, thereby to detect the path extending from the bridge certificate authority $CA_{bridge}$ to the EE-certificate issuing certificate authority $CA_{13}$ ($CA_{bridge}$-$CA_{11}$-$CA_{13}$), and the CRL issued by this EE-certificate issuing certificate authority $CA_{13}$.

In this manner, the path search unit 51 continues the above process as to each of all the CAs located on the detected path, until any issue destination (certificate authority CA other than the loop CA) not noticed yet becomes nonexistent among the information items of the issue destinations obtained from the pertinent certificate authority CA. Thus, the unit 51 detects the paths which extend from the bridge certificate authority $CA_{bridge}$ to the respective EE-certificate issuing certificate authorities CAs.

The above is the process of the step S1003 in the case where any desired CA is set as the trust anchor CA.

As will be stated later, path search is similarly performed in a case where each of the certificate authorities $CA_{11}$ and $CA_{21}$ is set as the trust anchor CA.

Meanwhile, when the paths have been detected by the path search unit 51 ("Yes" at a step S1004), the control unit 55 requests the path validation unit 52 to validate the paths. Upon receiving the request, the path validation unit 52 verifies the paths detected by the path search unit 51 (step S1005).

Concretely, the path validation unit 52 executes the ensuing process as to each of the paths detected by the path search unit 51.

First, the path validation unit 52 accesses the public key certificate databases 44 of the individual CAs on each path so as to obtain public key certificates which these CAs have issued to the CAs respectively located directly downstream on the pertinent path (to the end entities EE in a case where the access-destination CA is the EE-certificate issuing CA).

Subsequently, the path validation unit 52 verifies the signature of the public key certificate issued by the EE-certificate issuing CA located at the downmost stream on the path, in the light of the public key certificate issued by the EE-certificate issuing CA. In a case where the signature has been verified, the unit 52 verifies the signature of the public key certificate of the pertinent EE-certificate issuing CA, in the light of the public key certificate of the certificate authority CA located directly upstream still further. Such a process is continued until the certificate authority CA located directly upstream becomes the trust anchor CA, thereby to validate the pertinent path. Further, the unit 52 verifies the CRL issued by the pertinent EE-certificate issuing CA, in the light of the public key certificate of this EE-certificate issuing CA.

By way of example, in a case where the path extending from the bridge certificate authority $CA_{bridge}$ to the EE-certificate issuing certificate authority $CA_{12}$ ($CA_{bridge}$-$CA_{11}$-$CA_{12}$) in FIG. 2, and the CRL are to be verified, the signature of the public key certificate of the EE-certificate issuing certificate authority $CA_{12}$ is first verified using the public key certificate of the certificate authority $CA_{11}$ being the certificate authority CA located directly upstream of the certificate authority $CA_{12}$ in the path. Subsequently, in a case where the signature has been verified, the signature of the public key certificate of the certificate authority $CA_{11}$ is verified using the public key certificate of the bridge certificate authority $CA_{bridge}$ located directly upstream of the certificate authority $CA_{11}$ in the path. Besides, in a case where the signature has been verified, the CRL issued by the EE-certificate issuing certificate authority $CA_{12}$ is further verified in the light of the public key certificate of this EE-certificate issuing certificate authority $CA_{12}$. In a case where the path and the CRL have been verified, the path which extends from the bridge certificate authority $CA_{bridge}$ to the EE-certificate issuing certificate authority $CA_{12}$ shall have been tentatively verified.

Next, when the path has been tentatively verified, the path validation unit 52 checks whether or not the description of a constraint, such as the names of other certificate authorities which are not trusted (Name Constraints) or the maximum path length which is allowed for the authentication of the validity of any public key certificate (the maximum allowable number of certificate authorities on the path), is existent in the public key certificates obtained from the respective certificate authorities CAs on the pertinent path. In the existence of such a description, the unit 52 checks whether or not the pertinent path observes the constraint, and it decides that the pertinent path has been validated, only when the constraint is observed.

Meanwhile, when the respective paths detected by the path search unit 51 have been verified by the path validation unit 52 as stated above, the control unit 55 performs a registration process. More specifically, in a case where the path has been verified by in the path validation unit 52 ("Yes" at a step S1006), the control unit 55 registers the pertinent path in the valid-path database 56A, in association with the trust anchor CA, the EE-certificate issuing CA, and the CRL issued by this EE-certificate issuing CA (step S1007), whereupon it shifts to the step S1003. Besides, in a case where the path has not been verified by the path validation unit 52 ("No" at the step S1006), the control unit 55 registers the pertinent path in the invalid-path database 56B, in association with the trust anchor CA, the EE-certificate issuing CA, and the CRL issued by this EE-certificate issuing CA (step S1008), whereupon it shifts to the step S1003.

The control unit 55 iterates the steps S1003-S1008 until any path is no longer detected ("No" at the step S1004), so as to create the path database 56. On this occasion, each of all CAs is set as the trust anchor, and all corresponding paths are searched for. In the case where the CA configuration is as shown in FIG. 2, each of the three CAs; $CA_{11}$, $CA_{21}$ and $CA_{bridge}$ is set as the trust anchor, and all paths corresponding to each CA are searched for.

In the case where the individual CAs are in the relationship shown in FIG. 2, all the paths which are detected by the path search unit 51 as the result of the processing of the steps S1003-S1008 become as shown in FIG. 9.

On the other hand, the validity term/revocation state examination unit 53 checks whether or not any public key certificate whose validity term has expired is existent among the public key certificates registered in the valid-path database 56A (step S1009) In the existence of the validity term-expired public key certificate, the unit 53 accesses the public key certificate database 44 of the issue-origin CA of the pertinent public key certificate so as to search for a public key certificate which has been issued to the issue destination of the pertinent public key certificate anew (step S1010).

If such a new public key certificate is not existent in the public key certificate database 44 of the issue-origin CA, information about the path registered in association with the validity term-expired public key certificate is deleted from the valid-path database 56A, and it is registered in the invalid-path database 56B (step S1011). On the other hand, if such a new public key certificate is existent in the public key certificate database 44 of the issue-origin CA, it is obtained. Further, the validation of the path registered in the valid-path database 56A in association with the validity term-expired public key certificate is executed in accordance with the same manner as at the above step S1005 by using the public key certificate which has been obtained anew instead of the validity term-expired public key certificate (step S1012).

Figure 8:
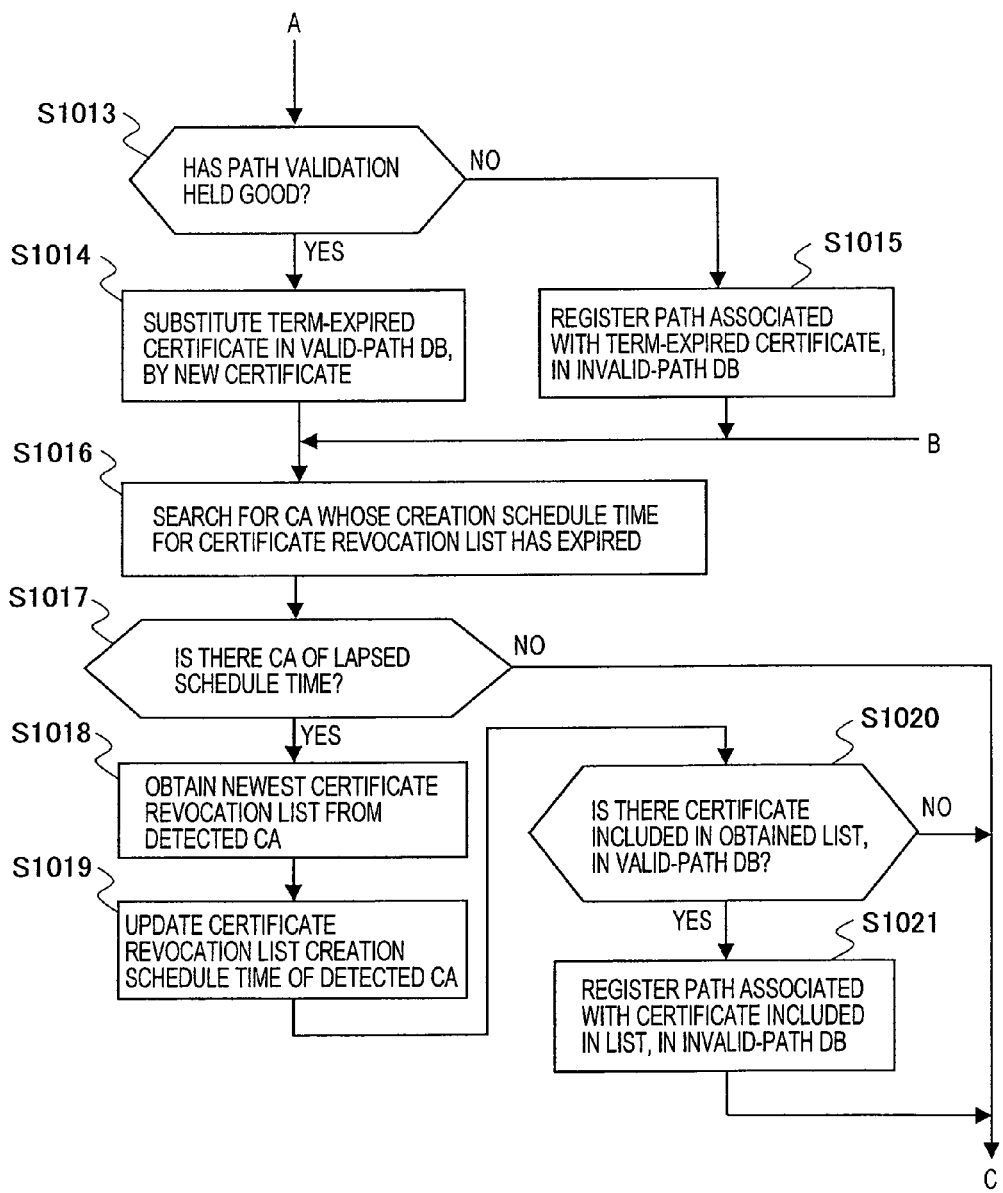
FIG. 8 is a flow chart for explaining the operation of searching for, validating and managing a path as proceeds in the VA shown in FIG. 5.

Referring to FIG. 8, in a case where the path has been verified ("Yes" at a step S1013), the validity term-expired public key certificate registered in the valid-path database 56A in association with the pertinent path is substituted by the public key certificate obtained anew (step S1014). On the other hand, in a case where the path has not been verified ("No" at the step S1013), the path registered in association with the validity term-expired public key certificate is deleted from the path database 56A, and the path with which the public key certificate obtained anew is associated is registered in the invalid-path database 56B (step S1015).

Subsequently, the validity term/revocation state examination unit 53 examines the certificate revocation list creation schedule time database 57 so as to search for any CA associated with a certificate revocation list creation schedule time which has already lapsed (step S1016). In the existence of such a certification authority CA ("Yes" at a step S1017), the unit 53 accesses the certificate revocation list holding unit 46 of the pertinent CA so as to obtain the newest certificate revocation list issued by this CA (step S1018). And, the unit 53 updates the certificate revocation list creation schedule time registered in association with the pertinent certificate authority CA, to a certificate revocation list creation schedule time described in the newest certificate revocation list obtained, in the certificate revocation list creation schedule time database 57 (step S1019).

Thereafter, the validity term/revocation state examination unit 53 checks whether or not any public key certificate described in the newest certificate revocation list obtained is registered in the valid-path database 56A (step S1020). In a case where the public key certificate is registered, information about any path associated with this public key certificate is deleted from the valid-path database 56A, and it is registered in the invalid-path database 56B (step S1021).

There will now be explained the operation of authenticating the validity of a public key certificate.

Figure 10:
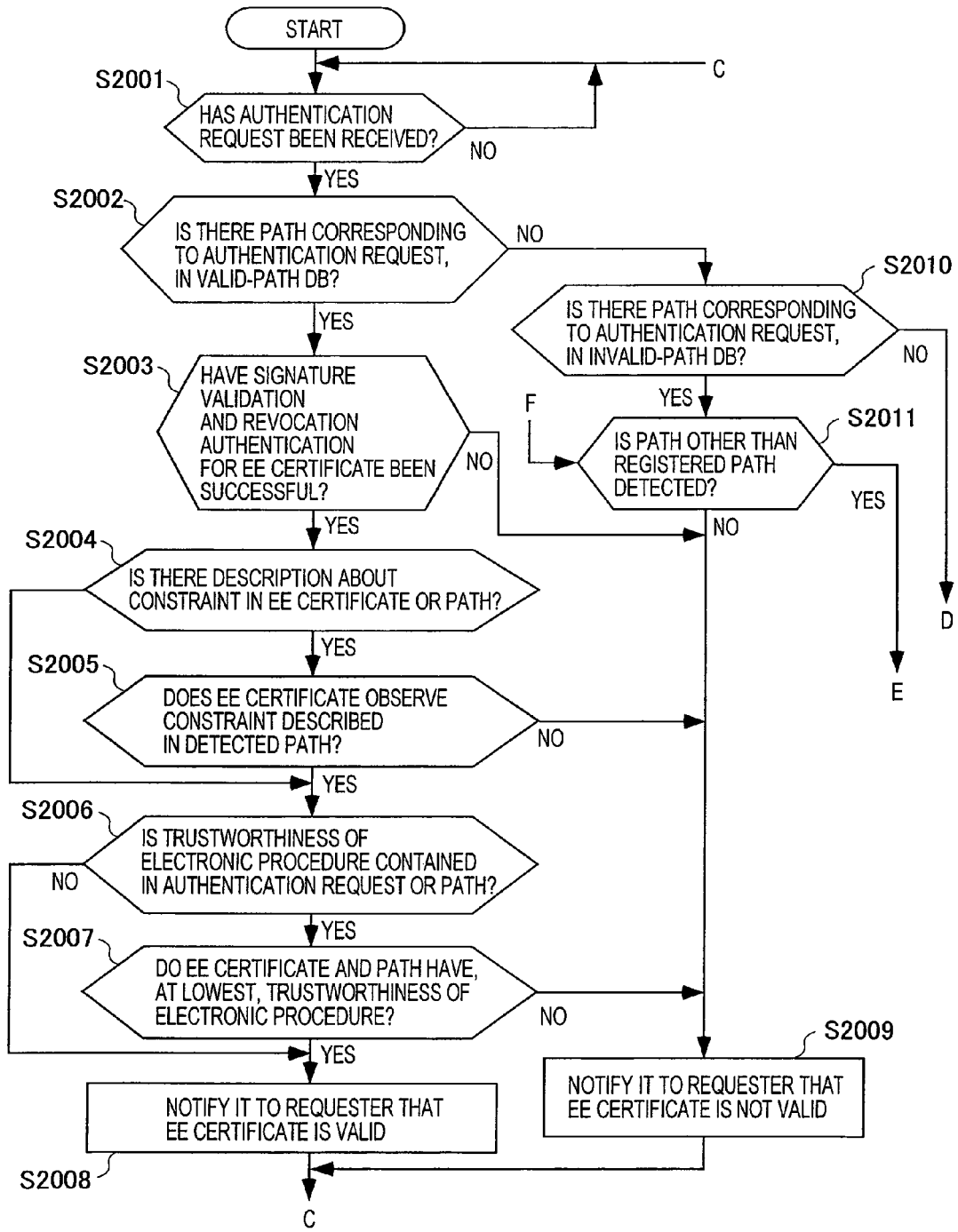
FIG. 10 is a flow chart for explaining the operation of authenticating the validity of a public key certificate as is executed by the VA shown in FIG. 5.
Figure 11:
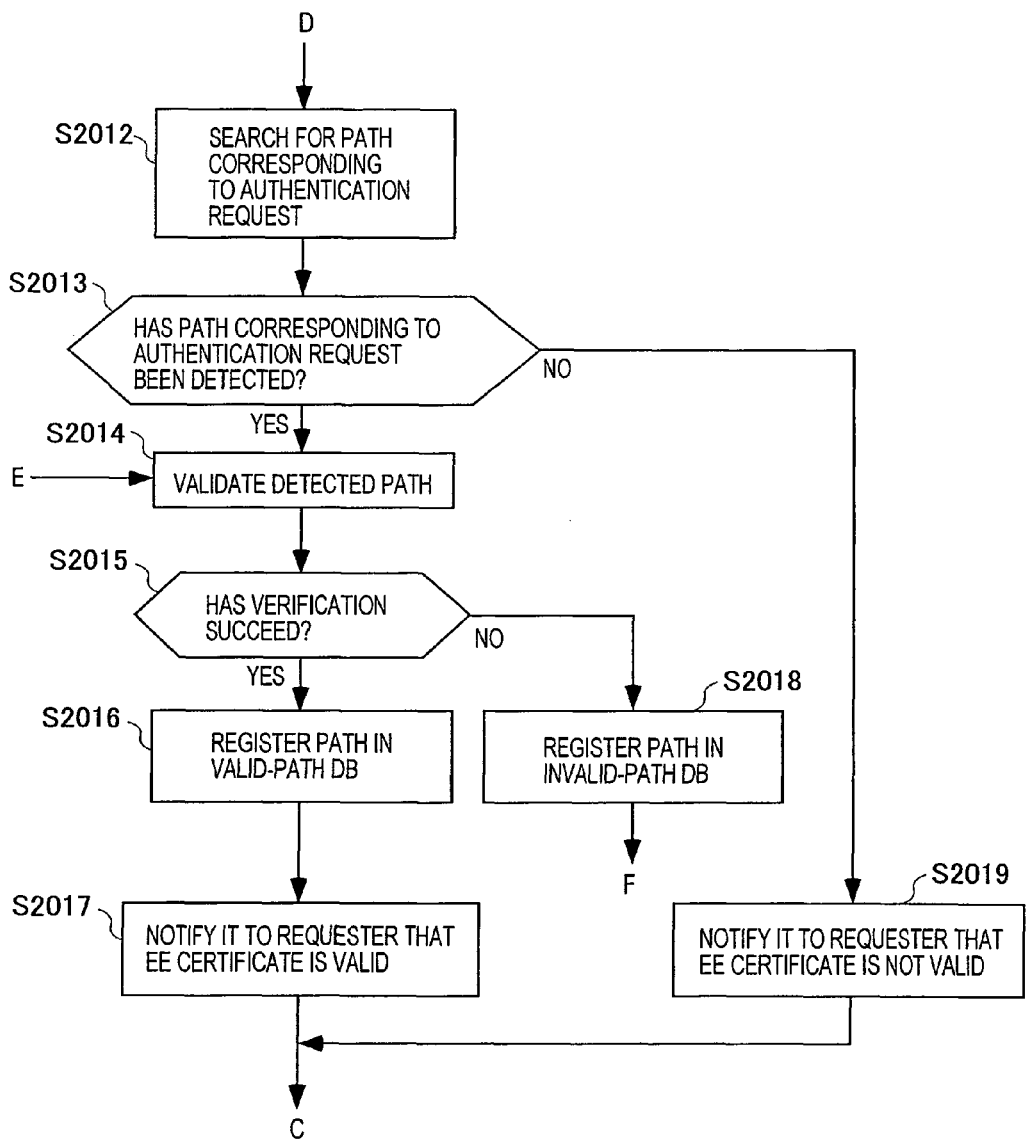
FIG. 11 is a flow chart for explaining the operation of authenticating the validity of the public key certificate as is executed by the VA shown in FIG. 5.
Figure 12:
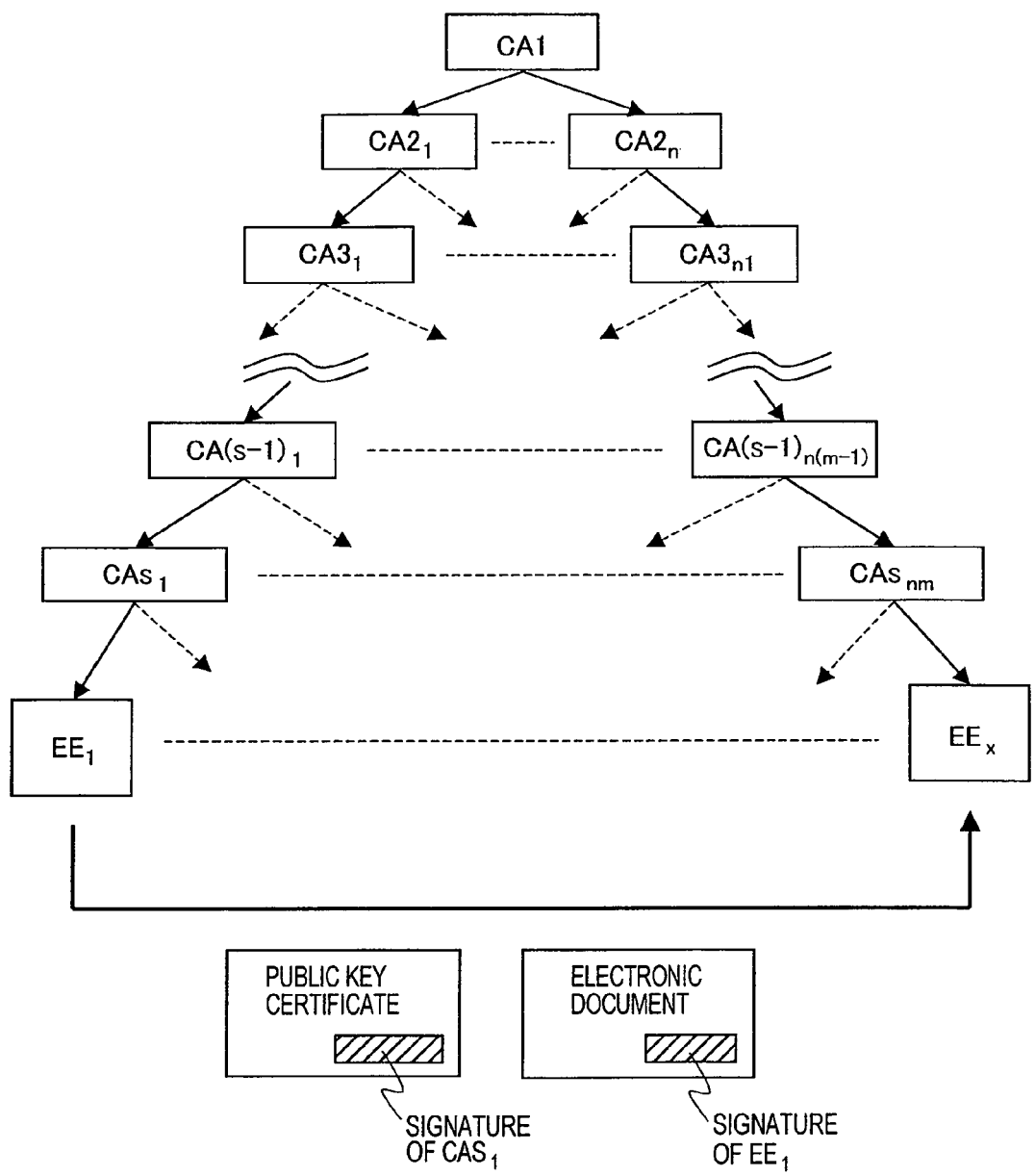
FIG. 12 is a diagram showing an example of the relationship among a plurality of certificate authorities which exist in a prior-art PKI.

FIGS. 10 and 11 are flow charts for explaining the operation of authenticating the validity of a public key certificate as is executed in the VA apparatus (14) in this embodiment.

When the control unit 55 has received a request for the authentication of the validity of a public key certificate, which contains at least the name of any trust anchor CA trusted by a certain end entity EE and which is of an EE other than the certain EE, from the certain EE through the communication unit 50c (step S2001), it notifies the reception of the request to the validity authentication unit 54.

Upon receiving the notification, the validity authentication unit 54 checks whether or not a path associated with the trust anchor CA and the EE certificate issuing CA having issued the public key certificate, which are specified from the description of the request for authenticating the validity of this public key certificate, are registered in the valid-path database 56A (step S2002).

If, as a result, it has been found that the path associated with the trust anchor CA and the EE certificate issuing CA having issued the pertinent certificate, which are described in the validity authentication request for this certificate, is registered in the valid-path database 56A ("Yes" at the step S2002), the validity authentication unit 54 verifies the signature of the EE certificate by using the public key certificate of the EE certificate issuing CA which is the end point of the pertinent path. Further, the validity authentication unit 54 checks if the EE certificate has been revoked, by using a CRL which is registered in association with the pertinent path (step S2003).

In a case where the validation of the signature of the EE certificate has failed, or where the EE certificate is described in the CRL and has been revoked ("No" at the step 2003), the validity authentication unit 54 judges the EE certificate to be invalid and notifies to the requester EE through the communication unit 50c that the EE certificate is not valid (step S2009).

Meanwhile, each certificate contains an extended item which can describe a constraint based on the name of any certificate authority which is not trusted, or the maximum path length which is allowed for the authentication of the validity of any public key certificate (the maximum allowable number of certificate authorities on the path). In a case where the signature validation and the revocation authentication for the EE certificate have been successful at the step S2003 (in case of "Yes"), the validity authentication unit 54 further checks whether or not such a constraint is described in the EE certificate and the public key certificates of the individual CAs included in the pertinent path (step S2004).

In the nonexistence of the description of such a constraint, the validity authentication unit 54 shifts to a step S2006.

On the other hand, in the existence of the description of such a constraint, the validity authentication unit 54 shifts to a step S2005, and it checks whether or not the EE certificate interferes with the constraint. Here, in a case where the EE certificate interferes with the constraint item, the validity authentication unit 54 notifies to the requester EE (11) through the communication unit 50c that the public key certificate is not valid (step S2009). On the other hand, in a case where the EE certificate does not interfere with the constraint item, the unit 54 shifts to the step S2006.

At the step S2006, the validity authentication unit 54 checks whether or not a policy which indicates the amount of business, or the like of an electronic procedure to be taken by the pertinent EE is contained in the authentication request received from the pertinent EE apparatus (11).

In a case where the policy is contained, the unit 54 further checks whether or not the description of any policy satisfying the above policy is existent in the EE certificate and the public key certificates which constitute the pertinent path (step S2007).

In a case where the description of any policy satisfying the above policy is not existent in the EE certificate and the pertinent path, the validity authentication unit 54 judges the EE certificate as failing to be utilized for the authentication of the validity of the public key certificate for the electronic procedure to be taken by the requester EE, and the unit 54 notifies to the requester EE apparatus (11) through the communication unit 50c that the public key certificate is not valid (step S2009).

On the other hand, in a case where the policy which indicates the electronic procedure to be taken by the EE is not contained in the authentication request received from the pertinent EE ("No" at the step S2006), or in a case where the policy is contained, but where any policy described in the pertinent path and the EE certificate satisfies the above policy ("Yes" at the step S2007), the validity authentication unit 54 judges the public key certificate as being valid, and the unit 54 notifies to the requester EE through the communication unit 50c that the public key certificate is valid (step S2008).

Besides, in a case where, at the step S2002, the path associated with the trust anchor CA and the EE certificate issuing CA having issued the pertinent certificate, which are described in the request for the authentication of the validity of the certificate, is not registered in the valid-path database 56A ("No" at the step S2002), the validity authentication unit 54 checks whether or not the pertinent path is registered in the invalid-path database 56B (step S2010). In a case where the pertinent path is not registered in the invalid-path database 56B ("No" at the step S2010), the routine shifts to a step S2012 in FIG. 11.

At the step S2012, the path search unit 51 searches for a path which extends from the trust anchor CA described in the authentication request, to the EE certificate to-be-authenticated. This search is extraordinarily performed unlike the search which the path search unit 51 performs in accordance with predetermined rules.

In a case where the path search unit 51 has not detected the path extending from the trust anchor CA to the EE certificate ("No" at a step S2013), the validity authentication unit 54 notifies to the requester EE through the communication unit 50c that the EE certificate is not valid (step S2019). On the other hand, in a case where the path search unit 51 has detected the path extending from the trust anchor CA to the EE certificate ("Yes" at the step S2013), the path validation unit 52 verifies the detected path (step S2014).

In a case where the detected path has been successfully verified ("Yes" at a step S2015), the pertinent path which extends from the trust anchor CA to the EE certificate issuing CA, and the CRL which the EE certificate issuing CA issues are registered in the valid-path database 56A (step S2016). And, the validity authentication unit 54 notifies to the requester EE through the communication unit 50c that the EE certificate is valid (step S2017).

On the other hand, in a case where the detected path has not been verified at the step S2015 ("No" at the step S2015), the pertinent path which extends from the trust anchor CA to the EE certificate issuing CA, and the CRL which the EE certificate issuing CA issues are registered in the invalid-path database 56B (step S2018). Then the routine shifts to a step S2011, which checks if any path other than the path having hitherto been detected is existent, and the subsequent steps are similarly executed.

Besides, in a case where the pertinent path has been registered in the invalid-path database 56B, at the step S2010 in FIG. 10 ("Yes" at the step S2010), and where any path corresponding to the validity authentication request has been detected otherwise than the registered path ("Yes" at the step S2011), the routine shifts to the step S2014, whereupon the detected path is subjected to the validation and registration processing (step S2014-step S2019).

On the other hand, in a case where any path corresponding to the validity authentication request has not been detected otherwise than the registered path ("No" at the step S2011), the validity authentication unit 54 notifies it to the requester EE through the communication unit 50c that the public key certificate is not valid (step S2009).

In the above embodiment, the search for and validation of any path extending from the trust anchor CA to each EE certificate issuing CA are performed, for example, periodically in accordance with predetermined rules which are independent of the validity authentication request for the public key certificate from the EE.

The path searched for and verified is classified into a valid path or an invalid path, and is registered in the corresponding path database. Thus, whether or not the pertinent EE certificate is valid is judged by examining whether the path corresponding to the validity authentication request is registered as the valid path or as the invalid path.

On this occasion, in a case where the path corresponding to the validity authentication request is registered as the invalid path, the existence of any corresponding path other than the invalid path is searched for, verified, and authenticated. On the other hand, in a case where the path corresponding to the validity authentication request is not registered in the path database, path search and validation are extraordinarily performed. Accordingly, even when the configuration of certificate authorities has changed, the validation is performed using the newest path information, and hence, an appropriate validity authentication result can be produced. Moreover, a time period which is expended since the acceptance of the public key certificate till the authentication of the validity thereof can be shortened by caching the invalid path.

Besides, according to this embodiment, in registering a path, a CRL which is issued by an EE certificate issuing CA being the end point of the path is registered together with the result of the validation of the CRL. Thus, in a case where a request for authenticating the validity of a public key certificate has been received from a certain EE, if the EE certificate has been revoked is authenticated using the CRL. Accordingly, a time period which is expended on the validity authentication for the public key certificate can be shortened still further.

Incidentally, the present invention is not restricted to the foregoing embodiment, but it can have various modifications within the scope of the purport thereof.

By way of example, in the foregoing embodiment, in registering paths in databases, a VA classifies the paths and registers them in the two databases of a valid-path database 56A and an invalid-path database 56B. The paths, however, may well be classified into valid paths and invalid paths by setting flags indicative of the statuses of the paths, thereby to be registered in one database.

In the foregoing embodiment, it is assumed for the brevity of description that, as shown in FIG. 2, EE certificate issuing CAs issue public key certificates to EEs only, while the other CAs issue public key certificates to CAs only. The present invention, however, is applicable also to a case where a PKI system includes a CA which issues public key certificates to both the EE and the CA.

Besides, in the foregoing embodiment, it is assumed for the brevity of description that the configuration of CAs has a hierarchical structure as shown in FIG. 2, but the present invention is applicable also to a case where the configuration of CAs has a more complicated mesh structure.

The specification and drawings are, accordingly, to be regarded in an illustrative rather than a restrictive sense. It will, however, be evident that various modifications and changes may be made thereto without departing from the spirit and scope of the invention as set forth in the claims.

We claim:

1. A method for authenticating validity of a public key certificate in compliance with a request, performed by a validation authority apparatus for certificates, said method comprising the steps of:
   searching for paths and validating the paths searched for;
   registering a searching and validating result in a path database; and
   validity authentication, comprising the steps of:
      receiving a request for authenticating validity of a public key certificate, from a terminal device;
      in a case where any valid path corresponding to the validity authentication request is registered in the path database, validating a public key certificate in the request by using a valid path; and
      in a case where no valid path corresponding to the validity authentication request is registered in the path database, searching a new path and validating the public key certificate in the request by using the searched path;
   wherein: at the registering step, information indicating whether paths are valid or invalid in accordance with results of searching for paths and validating the paths is registered in the path database, and at the validity authentication, in a case where a path corresponding to the validity authentication request is registered as the valid path or the invalid path in the path database, authentication of the validity of the public key certificate in the request is performed in accordance with the registered results;
   the said method further comprising the steps of: performing path validation in compliance with the validity authentication request, in a case where, at the validity authentication, a constraint item is described in a pertinent public key certificate or any public key certificate included in a pertinent path, although a path corresponding to the validity authentication request is registered as a valid path in the path database, and determining if the pertinent public key certificate and the pertinent path satisfy the constraint item; and
   judging the pertinent path as a valid path if the constraint item is satisfied.

2. The method for authenticating validity of a public key certificate as defined in claim 1, further comprising the steps of:
   performing path validation in compliance with the validity authentication request, in a case where, at the validity authentication step, a policy is described in the validity authentication request, a pertinent public key certificate, or any public key certificate included in a pertinent path, although a path corresponding to the validity authentication request is registered as the valid path in the path database, and determining if the pertinent public key certificate and the pertinent path satisfy the policy of an electronic procedure; and
   judging the pertinent path as a valid path in a case where the policy is satisfied.

3. The method for authenticating validity of a public key certificate as defined in claim 1, wherein the registering step comprises the steps of:
   searching for each path which extends from a trust anchor certificate authority to a certificate authority that issues an end entity certificate;
   acquiring and validating a certificate revocation list with respect to the end entity certificate issued by the certificate authority that issues the pertinent end entity certificate; and
   registering the certificate revocation list together with a validation result thereof.

4. The method for authenticating validity of a public key certificate as defined in claim 3, wherein:
   in a case where, at the validity authentication, a path corresponding to the validity authentication request is registered as a valid path in the path database, it is authenticated without validating the certificate revocation list that a pertinent public key certificate is not revoked.

5. A method for authenticating validity of a public key certificate performed by a computer to authenticate validity of the certificate, comprising the steps of:
   searching for paths and validating the paths searched for;
   registering a searching and validating result in a path database; and
   validity authentication, comprising the steps of:
      in a case where any valid path corresponding to a validity authentication request is registered in the path database, validating a public key certificate in the request by using a valid path; and
      in a case where no valid path corresponding to the validity authentication request is registered in the path database, searching a new path and validating a public key certificate in the request by using the searched path;

wherein: at the registering step, information indicating valid paths and invalid paths in accordance with results of searching paths and validating the searched paths is registered in the path database, and at the validity authentication, in a case where a path corresponding to the validity authentication request is registered as the valid path or the invalid path in the path database, the validity authentication of the public key certificate in the request is performed in accordance with the registered results;

the said method further comprising the steps of: performing path validation in compliance with the validity authentication request, in a case where, at the validity authentication, a constraint item is described in a pertinent public key certificate or any public key certificate included in a pertinent path, although a path corresponding to the validity authentication request is registered as a valid path in the path database, and determining if the pertinent public key certificate and the pertinent path satisfy the constraint item; and judging the pertinent path as a valid path if the constraint item is satisfied.

6. The method for authenticating validity of a public key certificate as defined in claim 5, further comprising the steps of:

performing path validation in compliance with the validity authentication request, in a case where, at the validity authentication step, a policy is described in the validity authentication request, a pertinent public key certificate or any public key certificate included in a pertinent path, although a path corresponding to the validity authentication request is registered as the valid path in the path database, and determining if the pertinent public key certificate and the pertinent path satisfy the policy of an electronic procedure; and judging the pertinent path as a valid path in a case where the policy is satisfied.

7. The method for authenticating validity of a public key certificate as defined in claim 5, further comprising the steps of:

searching for each path which extends from a trust anchor certificate authority to a certificate authority that issues an end entity certificate;

acquiring and validating a certificate revocation list with respect to the end entity certificate, and which is issued by the certificate authority that issues a pertinent end entity certificate; and registering the certificate revocation list together with a validation result thereof.

8. The method for authenticating validity of a public key certificate as defined in claim 7, wherein in a case where, at the validity authentication, a path corresponding to the validity authentication request is registered as a valid path in the path database, it is authenticated without validating the certificate revocation list that a pertinent public key certificate is not revoked.

* * * * *